United States Patent
Lin et al.

(10) Patent No.: US 8,554,223 B2
(45) Date of Patent: Oct. 8, 2013

(54) BASE STATION, FEMTOCELL AND HANDOVER MONITORING METHOD THEREOF

(75) Inventors: Yu-Hsiang Lin, Taoyuan County (TW); Ching-Lun Lin, Zhongli (TW); Zi-Tsan Chou, Taipei (TW); Rong-Hong Jan, Hsinchu (TW)

(73) Assignee: Institute for Information Industry, Taipei (TW)

( * ) Notice: Subject to any disclaimer, the term of this patent is extended or adjusted under 35 U.S.C. 154(b) by 178 days.

(21) Appl. No.: 12/960,010

(22) Filed: Dec. 3, 2010

(65) Prior Publication Data

US 2012/0115460 A1 May 10, 2012

(30) Foreign Application Priority Data

Nov. 9, 2010 (TW) .............................. 99138460 A (51) Int. Cl.
*H04W 36/00* (2009.01)
(52) U.S. Cl.
USPC ............ 455/436; 455/438; 455/439; 370/331
(58) Field of Classification Search
USPC .......................... 455/436, 439, 438; 370/331
See application file for complete search history.

(56) References Cited

U.S. PATENT DOCUMENTS

| | | | |
|---|---|---|---|
| 2008/0096560 A1* | 4/2008 | Felske et al. ................. | 455/436 |
| 2008/0254797 A1* | 10/2008 | Achtari et al. ............... | 455/436 |
| 2009/0092096 A1* | 4/2009 | Czaja et al. .................. | 370/331 |
| 2010/0130222 A1* | 5/2010 | Claussen et al. ........... | 455/452.2 |

* cited by examiner

*Primary Examiner* — Danh Le
(74) *Attorney, Agent, or Firm* — Ping Wang; Andrews Kurth LLP (57) ABSTRACT

A base station, a femtocell, and a handover monitoring method thereof are provided. A wireless network system comprises a server, a mobile device, the base station, and the femtocell. The base station transmits a monitoring signal to the femtocell after it obtains a piece of information corresponding to the mobile device from the server. The femtocell keeps detecting whether a signal is transmitted by the mobile device after it receives the monitoring signal. The femtocell transmits a response signal corresponding to the monitoring signal to the base station after it detects the signal transmitted by the mobile device. The base station transmits a handover signal to the mobile device after it receives the response signal so that the mobile device handovers from the base station to the femtocell. A handover monitoring from the base station to the femtocell for the mobile device is provided by the hand monitoring method.

4 Claims, 7 Drawing Sheets

BASE STATION, FEMTOCELL AND HANDOVER MONITORING METHOD THEREOF

This application claims priority to Taiwan Patent Application No. 099138460 filed on Nov. 9, 2010, which is hereby incorporated by reference in its entirety.

BACKGROUND

1. Field

The present invention relates to a base station (BS), a femtocell, and a handover monitoring method thereof. More particularly, according to the BS, the femtocell and the handover monitoring method thereof of the present invention, the BS notifies the femtocell to monitor a mobile device so as to decide whether to handover.

2. Descriptions of the Related Art

Although wireless mobile communication networks have been developed for many years, users now still frequently experience poor communication quality and a too slow transmission speed when using mobile devices in indoor environments. For this reason, users have to use different network interfaces in different areas, and this leads to advent of multi-mode mobile devices. However, the multi-mode mobile devices are relatively expensive, which is undesirable for the users. Also, the problem of bandwidth limitation occurs to the wireless mobile communication networks. Specifically, the cellular network is characterized in that, the bandwidth it provides is shared by users within a specific BS coverage, so for outdoor users of the wireless mobile communication networks, the size of bandwidth available to each user is inversely proportional to the number of active users in the coverage. As the number of users of wireless mobile communication networks continues to increase significantly, burden on outdoor cellular BSs becomes increasingly greater and, accordingly, the size of bandwidth available to each individual user becomes increasingly smaller. To solve this problem, a business alliance named Femto Forum has been established in 2007 by some manufacturers to promote home-based femtocells as a complete solution.

A femotcell is a subminiaturized and low-power (small coverage) base station specially designed for use in indoor environment. It operates in a licensed wireless frequency range, e.g., the frequency range of the Worldwide Interoperability for Microwave Access (WiMAX) network or that of the Third Generation (3G) network. Through broadband fixed networks (e.g., digital subscriber lines (DSL) or cable modems) deployed in houses, the femtocell can connect a mobile device in a cellular network to an operator's network via an Internet Service Provider (ISP) network.

Deployment of such a femtocell has at least the following two advantages: firstly, the femtocell features a simple structure, low price and a simple installation procedure, so it is economical to use the femtocell to cover an indoor wireless communication range in place of a cellular BS; secondly, when a mobile device enters the signal coverage of the femtocell, the mobile device can be served by the femtocell in place of the cellular BS, which can not only enhance signal strength in the indoor environment but also avoid contention with other mobile devices in the signal coverage of the cellular BS for use of the network.

The handover mechanism is indispensible to wireless mobile communication networks. By "handover", it means a technical means by which a mobile device can be handed over from an original serving BS to another serving BS. Generally, handover procedures may be classified into two kinds. The first kind is handover initiated by a mobile device; i.e., when the mobile device finds that the signal strength goes lower than a preset threshold, it will initiate the handover scanning mechanism to search for BSs that can serve it and, from such BSs, choose the most appropriate one to perform the handover with. The second kind is termed as the network-initiated handover, according to which the BS currently serving the mobile device (hereinafter termed as the "serving BS") will request the mobile device to handover to a neighboring BS (hereinafter termed as the "target BS") according to a list of neighboring BSs. The list of neighboring BSs may be obtained through periodical scanning by the mobile device, or the serving BS may request the mobile device to scan for the list of neighboring BSs.

When a mobile device is located in a coverage range where both a BS and a femtocell provide desirable signal strength, the mobile device needs not to perform the handover scanning procedure to search for existence of the femtocell because the BS can still provide desirable signal strength. In this case, the femtocell will stay idle. Although the problem that the femtocell stays idle may be solved by the network-initiated handover mechanism, the conventional network-initiated handover mechanism is unable to effectively solve this problem. To be more specific, the network-initiated handover requires the BS to determine, through positioning or scanning report from the mobile device, if the mobile device enters the signal coverage of the femtocell, so as to notify the mobile device to perform the handover scanning. However, due to the poor positioning accuracy in the complex circumstances in metropolitans and the small signal coverage of femtocells, the femtocell has to request the mobile device to blindly perform the handover scanning to determine whether the mobile device enters it signal coverage. This leads to a time delay in data transmission and consequent degradation in service quality.

In view of this, an urgent need exists in the art to establish a handover mechanism and design a corresponding BS and a corresponding femtocell according to the handover mechanism to effectively solve the problem that the femtocell stays idle.

SUMMARY OF THE INVENTION

The objective of the present invention is to provide a base station (BS) and a handover monitoring method thereof as well as a femtocell and a handover monitoring method thereof, so as to effectively solve the problem that the femtocell stays idle and the problems caused by network-initiated handover in the prior art.

To achieve the aforesaid objective, the present invention provides a BS. A wireless network system comprises a server, a mobile device, the BS and a femtocell. The BS comprises a wireless network interface, a wired network interface and a processor. The wireless network interface defines a signal coverage and is configured to wirelessly connect to the mobile device when the mobile device is located in the signal coverage. The wired network interface connects to the server and the femtocell and is configured to acquire from the server a piece of information related to the mobile device after the wireless network interface wirelessly connects to the mobile device. The processor is configured to determine that the femtocell corresponds to the mobile device and resides in the signal coverage according to the information. After the processor determines that the femtocell corresponds to the mobile device, the wired network interface transmits a monitoring signal to the femtocell, wherein the monitoring signal is for directing the femtocell to monitor the mobile device on an operating frequency. The wired network interface further receives a response signal from the femtocell corresponding to the monitoring signal. The wireless network interface further transmits a handover signal to the mobile device in response to the response signal, and the handover signal directs the mobile device to handover to the femtocell.

To achieve the aforesaid objective, the present invention further provides a BS. A wireless network system comprises a server, a mobile device, a femtocell and the BS. The BS comprises a wireless network interface, a wired network interface and a processor. The wireless network interface defines a signal coverage and is configured to wirelessly connect to the mobile device when the mobile device is located in the signal coverage. The wired network interface connects to the server and the femtocell and is configured to acquire from the server a piece of information related to the mobile device after the wireless network interface wirelessly connects to the mobile device. The processor is configured to determine that the femtocell corresponds to the mobile device and resides in the signal coverage according to the information. After the processor determines that the femtocell corresponds to the mobile device, the wired network interface transmits a monitoring signal to the femtocell, wherein the monitoring signal is for directing the femtocell to monitor the mobile device on an operating frequency. Then, the processor enables the wired network interface to transmit to the femtocell a monitoring stop signal for directing the femtocell to stop monitoring the mobile device according to a stop condition.

To achieve the aforesaid objective, the present invention further provides a femtocell. A wireless network system comprises a server, a mobile device, a BS and the femtocell. The femtocell comprises a wired network interface, a first wireless network interface and a second wireless network interface. The wired network interface connects to the BS and is configured to receive a monitoring signal from the BS. The first wireless network interface is configured to monitor the mobile device on an operating frequency according to the monitoring signal and detect a signal transmitted by the mobile device. Upon detecting the signal, the first wireless network interface stops monitoring the mobile device, and the wired network interface transmits a response signal corresponding to the monitoring signal to the BS so that the BS transmits a handover signal to the mobile device after receiving the response signal, wherein the handover signal is for directing the mobile device to handover to the femtocell so as to connect to the second wireless network interface.

To achieve the aforesaid objective, the present invention further provides a femtocell. A wireless network system comprises a server, a mobile device, a BS and the femtocell. The femtocell comprises a wired network interface and a wireless network interface. The wired network interface connects to the BS and is configured to receive a monitoring signal from the BS. The wireless network interface is configured to monitor the mobile device on an operating frequency according to the monitoring signal and fails to detect a signal transmitted by the mobile device within a preset time interval after the wired network interface has received the monitoring signal. The wired network interface further receives a monitoring stop signal from the BS after the preset time interval, and the wireless network interface further stops monitoring the mobile device in response to the monitoring stop signal.

To achieve the aforesaid objective, the present invention further provides a handover monitoring method for a BS. A wireless network system comprises a server, a mobile device, the BS and a femtocell. The BS comprises a wireless network interface, a wired network interface and a processor. The wireless network interface defines a signal coverage. The wired network interface connects to the server and the femtocell. The handover monitoring method comprises the following steps of: (a) enabling the wireless network interface to wirelessly connect to the mobile device when the mobile device is located in the signal coverage; (b) after the step (a), enabling the wired network interface to acquire from the server a piece of information related to the mobile device; (c) enabling the processor to, according to the information, determine that the femtocell corresponds to the mobile device and resides in the signal coverage; (d) after the step (c), enabling the wired network interface to transmit a monitoring signal to the femtocell, the monitoring signal directing the femtocell to monitor the mobile device on an operating frequency; (e) after the step (d), enabling the wired network interface to receive a response signal corresponding to the monitoring signal from the femtocell; and (f) after the step (e), enabling the wireless network interface to transmit a handover signal to the mobile device, and the handover signal directing the mobile device to handover to the femtocell.

To achieve the aforesaid objective, the present invention further provides a handover monitoring method for a BS. A wireless network system comprises a server, a mobile device, the BS and a femtocell. The BS comprises a wireless network interface, a wired network interface and a processor. The wireless network interface defines a signal coverage. The wired network interface connects to the server and the femtocell. The handover monitoring method comprises the following steps of: (a) enabling the wireless network interface to wirelessly connect to the mobile device when the mobile device is located in the signal coverage; (b) after the step (a), enabling the wired network interface to acquire from the server a piece of information related to the mobile device; (c) enabling the processor to determine that the femtocell corresponds to the mobile device and resides in the signal coverage according to the information; (d) after the step (c), enabling the wired network interface to transmit a monitoring signal to the femtocell, the monitoring signal directing the femtocell to monitor a signal of the mobile device on an operating frequency; (e) after the step (d), enabling the processor to determine that a stop condition is satisfied; and (f) after the step (e), enabling the wired network interface to transmit a monitoring stop signal to a wired network interface of the femtocell, the monitoring stop signal directing the femtocell to stop monitoring the mobile device.

To achieve the aforesaid objective, the present invention further provides a handover monitoring method for a femtocell. A wireless network system comprises a server, a mobile device, a BS and the femtocell. The femtocell comprises a wired network interface, a first wireless network interface and a second wireless network interface. The wired network interface connects to the BS. The handover monitoring method comprises the following steps of: (a) enabling the wired network interface to receive a monitoring signal from the BS; (b) after the step (a), enabling the first wireless network interface to monitor the mobile device on an operating frequency according to the monitoring signal and detect a signal transmitted by the mobile device; (c) after the step (b), enabling the first wireless network interface to stop monitoring the mobile device; and (d) enabling the wired network interface to transmit a response signal corresponding to the monitoring signal to the BS so that the BS transmits a handover signal to the mobile device after receiving the response signal, the handover signal for directing the mobile device to handover to the femtocell so as to connect to the second wireless network interface.

To achieve the aforesaid objective, the present invention further provides a handover monitoring method for a femtocell. A wireless network system comprises a server, a mobile device, a BS and the femtocell. The femtocell comprises a wired network interface and a wireless network interface. The wired network interface connects to the BS. The handover monitoring method comprises the following steps of: (a) enabling the wired network interface to receive a monitoring signal from the BS; (b) after the step (a), enabling the wireless network interface to monitor the mobile device on an operating frequency according to the monitoring signal, wherein no signal transmitted by the mobile device is detected within a preset time interval after the wired network interface has received the monitoring signal; (c) after the preset time interval, enabling the wired network interface to receive a monitoring stop signal from the BS; and (d) after the wired network interface receives the a monitoring stop signal, enabling the wireless network interface to stop monitoring the mobile device.

According to the above descriptions, after the mobile device enters the signal coverage of the BS, the BS transmits a monitoring signal to the femtocell so that the femtocell can monitor the mobile device according to this monitoring signal. If the monitoring result reveals that the mobile device has entered the signal coverage of the femtocell, then the femtocell transmits a response signal to the BS so that the BS directs the mobile device to perform the handover. Thereby, the problem that the femtocell stays idle and the problems caused by network-initiated handover in the prior art can be effectively solved.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, the BS, the femtocell and the handover monitoring methods thereof according to the present invention will be explained with reference to embodiments thereof. It shall be appreciated that, the present invention primarily relates to a BS, a femtocell and a mobile device in a wireless network system as well as methods for monitoring handover therebetween. Therefore, in the following embodiments and the attached drawings, elements and steps not directly related to the present invention are omitted from depiction. Moreover, in order to disclose technical features of the present invention clearly, the attached drawings are all drawn in a slightly exaggerative way. This is only for ease of description but not to limit the present invention, and scope of the present invention shall be defined by the claims.

Figure 1:
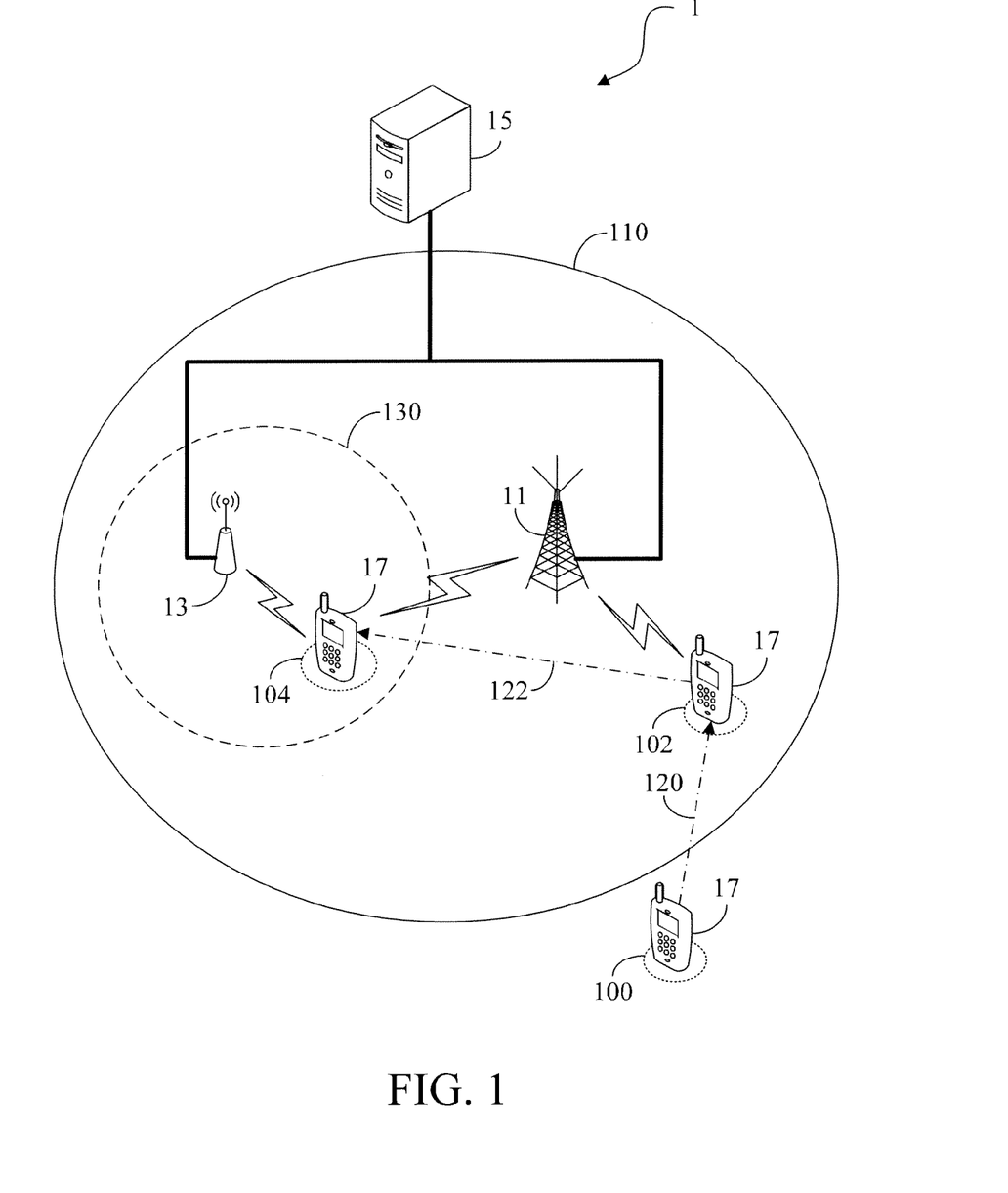
FIG. 1 is a schematic view illustrating a framework of a wireless network system according to a first embodiment of the present invention.
Figure 2:
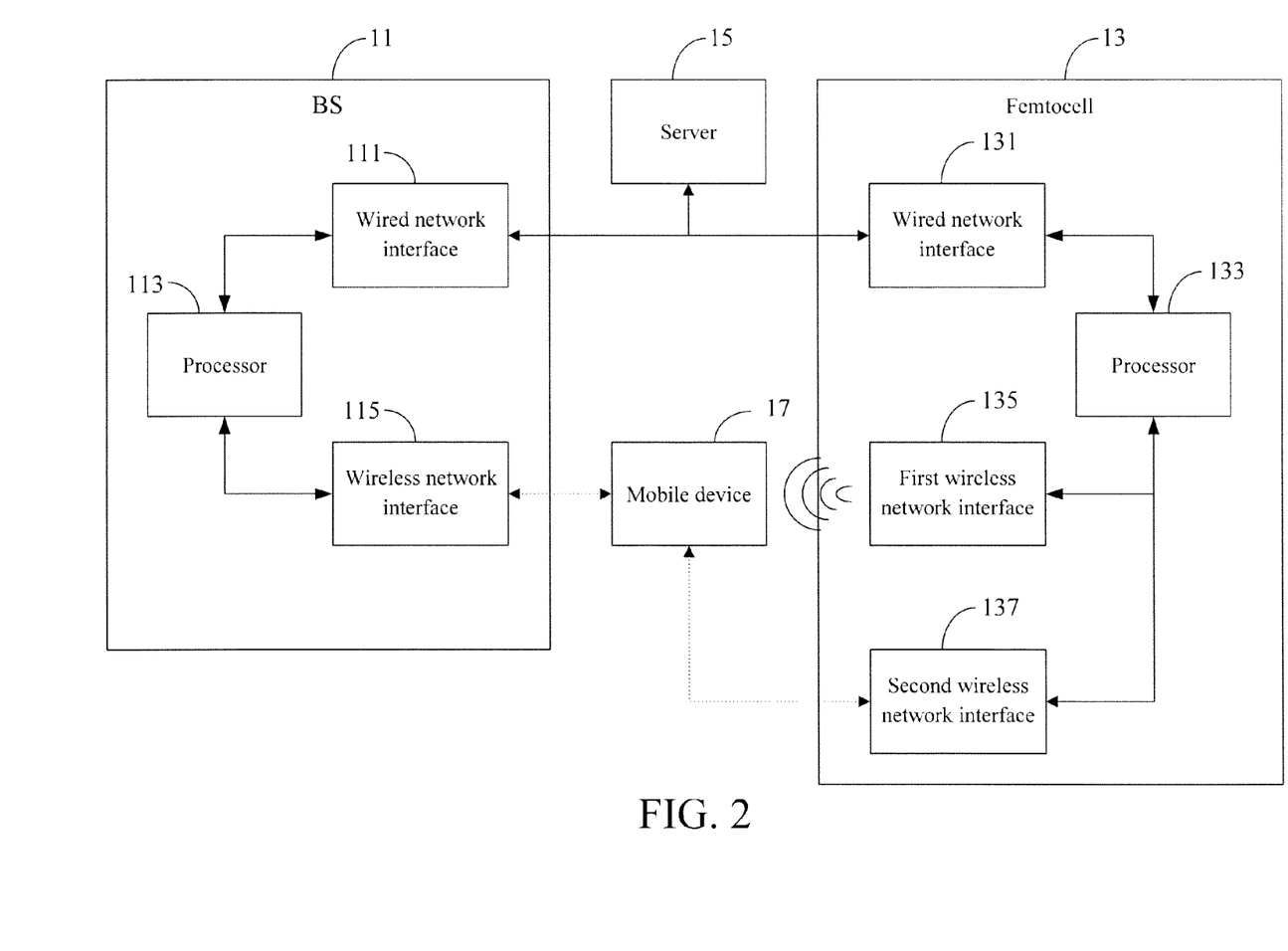
FIG. 2 is a schematic view illustrating internal components of a BS and a femtocell according to the first embodiment of the present invention.

A first embodiment of the present invention is a wireless network system 1, which will be described with reference to FIG. 1 and FIG. 2. FIG. 1 is a schematic view illustrating a framework of the wireless network system 1, and FIG. 2 is a schematic view illustrating internal components of a BS 11 and a femtocell 13 comprised in the wireless network system 1.

As shown in FIG. 1, the wireless network system 1 comprises a BS 11, a femtocell 13, a server 15 and a mobile device 17. As shown in FIG. 2, the BS 11 comprises a wired network interface 111, a processor 113 and a wireless network interface 115, and the femtocell 13 comprises a wired network interface 131, a processor 133, a first wireless network interface 135 and a second wireless network interface 137.

The processor 113 of the BS 11 and the processor 133 of the femtocell 13 can perform all operations of conventional BSs and conventional femtocells, so they will not be further described in this embodiment. The wireless network interface 115 of the BS 11 defines a signal coverage 110, and the first wireless network interface 135 of the femtocell 13 defines a signal coverage 130. Additionally, the wired network interface 111 of the BS 11 connects to the server 15 and the wired network interface 131 of the femtocell 13 via, for example, a broadband fixed network.

Initially, the mobile device 17 is located in an area 100 and is moving towards an area 102 along a route 120. When the mobile device 17 moves into the area 102 which belongs to the signal coverage 110 of the BS 11, the wireless network interface 115 of the BS 11 wirelessly connects to the mobile device 17. This is well-known to those of ordinary skill in the art and, thus, will not be further described herein.

After the wireless network interface 115 of the BS 11 wirelessly connects to the mobile device 17, the wired network interface 111 of the BS 11 acquires from the server 15 a piece of information related to the mobile device 17. According to this information, the processor 113 determines that the femtocell 13 corresponds to the mobile device 17 and resides in the signal coverage 110 of the BS 11. In more detail, because the femtocell 13 operates in a licensed wireless frequency band, related records should have already been stored in the server 15 when the femtocell 13 is purchased by the user. In addition, the server 15 also records data of the mobile device 17 of the user. Therefore, the information acquired by the wired network interface 111 of the BS 11 from the server 15 is related to these records and data.

After the processor 113 determines that the femtocell 13 corresponds to the mobile device 17, the wired network interface 111 of the BS 11 transmits to the femtocell 13 a monitoring signal carrying a piece of operating frequency information, so as to direct the femtocell 13 to monitor the mobile device 17 on an operating frequency indicated by the operating frequency information. The monitoring signal is received by the wired network interface 131 of the femtocell 13. After the monitoring signal is received by the femtocell 13, the first wireless network interface 135 of the femtocell 13 starts to monitor the mobile device 17 on the operating frequency.

On the other hand, after the wired network interface 111 of the BS 11 transmits a monitoring signal to the femtocell 13, the BS 11 enables the wireless network interface 115 thereof to transmit a handover signal to the mobile device 17 or enables the wired network interface 111 thereof to transmit a monitoring stop signal to the femtocell 13 depending on different conditions. Briefly speaking, if the wired network interface 111 of the BS 11 receives from the femtocell 13 a response signal corresponding to the monitoring signal, then the wireless network interface 115 transmits a handover signal to the mobile device 17. On the other hand, if the processor 113 determines that a stop condition is satisfied, the processor 113 will, according to the stop condition, enable the wired network interface 111 to transmit to the femtocell 13 a monitoring stop signal for directing the femtocell 13 to stop monitoring the mobile device 17.

Firstly, the case in which the BS 11 enables the wireless network interface 115 thereof to transmit a handover signal to the mobile device 17, i.e., the mobile device 17 enters the signal coverage 130 of the femtocell 13, will be described. Assume that, after the monitoring signal is received by the femtocell 13, the mobile device 17 moves into an area 104 along a route 122 and is thus located within the signal coverage 130. At this moment, if the mobile device 17 transmits a signal, the first wireless network interface 135 of the femtocell 13 will also be able to detect this signal and learn therefrom that the mobile device 17 is located within the signal coverage 130. Upon detecting this signal, the first wireless network interface 135 of the femtocell 13 stops monitoring the mobile device 17, and the wired network interface 131 transmits a response signal corresponding to the monitoring signal to the BS 11 as a response to the monitoring signal transmitted by the BS 11.

The response signal indicates that the mobile device 17 has entered the signal coverage 130 of the femtocell 13. This response signal will be received by the wired network interface 111 of the BS 11. Then, the wireless network interface 115 of the BS 11 transmits to the mobile device 17 a handover signal for directing the mobile device 17 to handover to the femtocell 13. After receiving the handover signal, the mobile device 17 handovers to the second wireless network interface 137 of the femtocell 13 and connects to the network via the second wireless network interface 137.

It shall be appreciated that, in respect of determining whether a signal transmitted by the mobile device 17 is detected by the first wireless network interface 135 of the femtocell 13, other examples may further define it as determining whether a signal transmitted by the mobile device 17 is detected within a preset time interval. In these other examples, only when a signal transmission from the mobile device 17 is detected by the femtocell 13 within the preset time interval after receiving the monitoring signal, will the femtocell 13 transmit a response signal to the BS 11. Furthermore, other examples of the present invention may further define that only when the signal transmitted by the mobile device 17 has a strength greater than a threshold, can the signal transmitted by the mobile device 17 be detected by the first wireless network interface 135 of the femtocell 13.

Next, the case in which the BS 11 enables the wired network interface 111 thereof to transmit a monitoring stop signal to the femtocell 13 will be described. In this case, the BS 11 must determine whether a stop condition is satisfied. For instance, either of the following situations may be considered as the stop condition to stop the monitoring: the mobile device 17 does not enter the signal coverage 130 of the femtocell BS 13 (i.e., the mobile device 17 has never entered the signal coverage 130 of the femtocell 13 since the femtocell 13 received the monitoring signal) or the mobile device 17 does not enter the signal coverage 130 until a preset time interval expires. In both situations, the first wireless network interface 135 of the femtocell 13 fails to detect any signal transmitted by the mobile device 17 within the preset time interval after the wired network interface 131 has received the monitoring signal. Consequently, the wired network interface 131 of the femtocell 13 will not transmit a response signal corresponding to the monitoring signal to the BS 11.

From the perspective of the BS 11, because no response signal is transmitted by the femtocell 13, the wired network interface 111 of the BS 11 fails to receive from the femtocell 13 a response signal corresponding to the monitoring signal within the preset time interval after the monitoring signal is transmitted by the wired network interface 111. Thus, the BS 11 learns that the mobile device 17 has not entered the signal coverage 130 of the femtocell 13. Accordingly, the processor 113 of the BS 11 determines that the stop condition to stop the monitoring is satisfied, and according to the determination result, enables the wired network interface 111 to transmit to the femtocell 13 a monitoring stop signal for directing the femtocell 13 to stop monitoring the mobile device 17. Then, the wired network interface 131 of the femtocell 13 receives the monitoring stop signal, according to which the first wireless network interface 135 stops monitoring the mobile device 17.

As another example, the stop condition may also be that the mobile device 17 is located outside the signal coverage 110 of the wireless network interface 115 of the BS 11. Hence, if the wireless network interface 115 of the BS 11 determines that the mobile device 17 has moved outside the signal coverage 110, the BS 11 enables the wired network interface 111 to transmit a monitoring stop signal to the femtocell 13 so that the first wireless network interface 135 of the femtocell 13 stops monitoring the mobile device 17. The several kinds of stop conditions described above are only provided for illustration, and those of ordinary skills in the art shall appreciate that other stop conditions may also be devised depending on other factors.

Through arrangement and operations of the first embodiment, the BS of the present invention can notify the femtocell to monitor the mobile device, and then according to the monitoring result of the femtocell, the BS decides whether to notify the mobile device to handover to the femtocell. In this way, the problem that the femtocell stays idle and the problems caused by network-initiated handover in the prior art are solved.

The second embodiment of the present invention is also a wireless network system 1, which will be described with reference to FIG. 1, FIG. 2, FIG. 3A and FIG. 3B. The second embodiment differs from the first embodiment mainly in that, in the second embodiment, the wireless network system 1 conforms to the Worldwide Interoperability for Microwave Access (WiMAX) standard. In other words, the BS 11, the femtocell 13, the server 15 and the mobile device 17 included in the wireless network system 1 of the second embodiment all communicate according to this standard. As communications stipulated in the WiMAX standard are well-known to those of ordinary skill in the art, no further description will be made herein. Hereinbelow, only differences of the second embodiment from the first embodiment will be described.

Figure 3A:
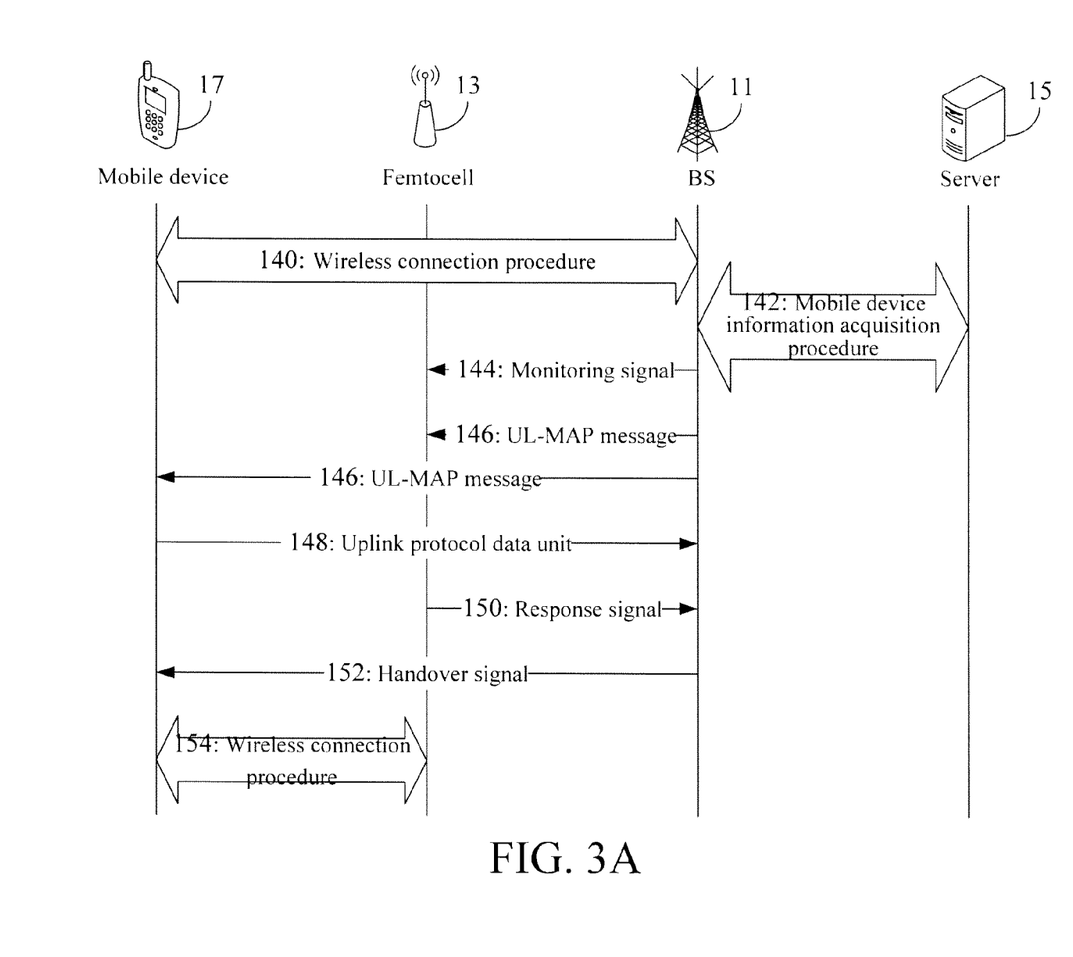
FIGS. 3A and FIG. 3B depict signal transmissions in a second embodiment of the present invention.
Figure 3B:
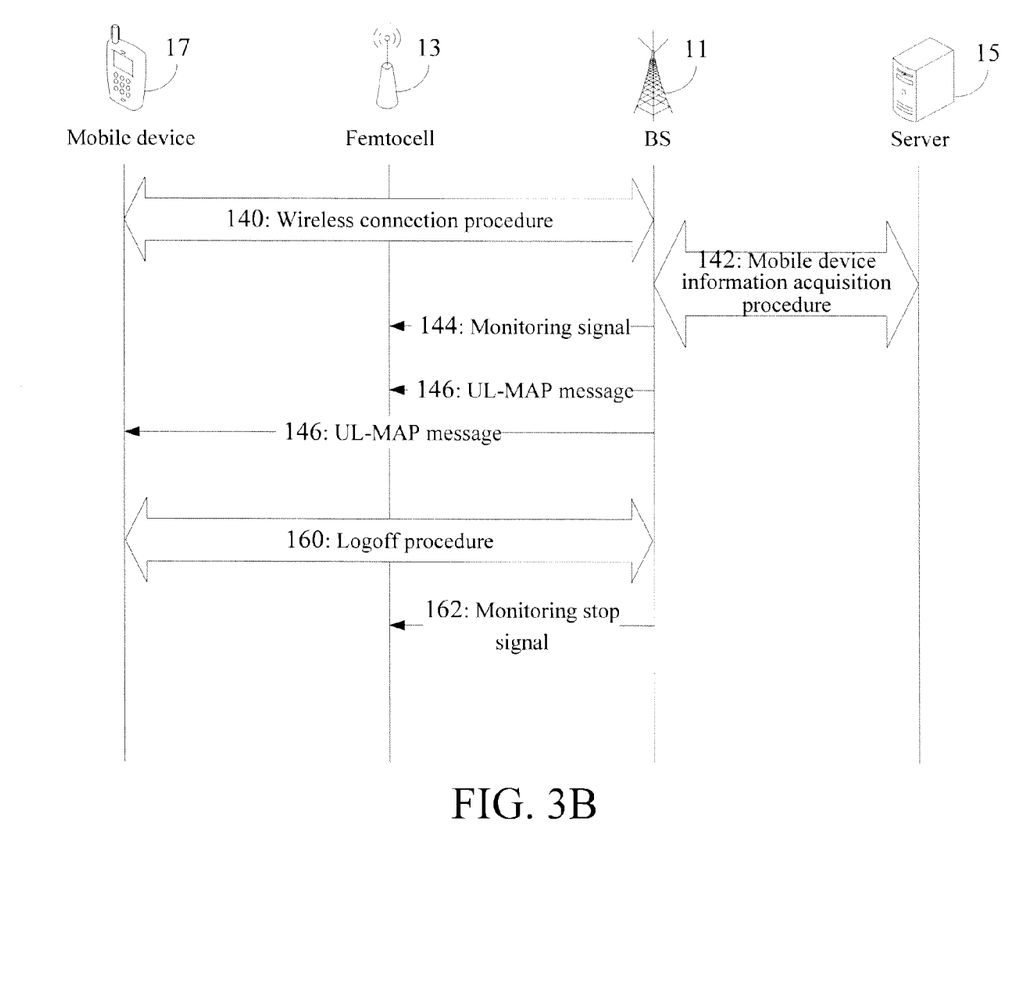

FIG. 3A and FIG. 3B depict signal transmissions in the second embodiment. FIG. 3A depicts a case in which the mobile device 17 enters the signal coverage 130 of the femtocell 13, and FIG. 3B depicts a case in which the mobile device 17 does not enter the signal coverage 130 of the femtocell 13.

In FIG. 3A and FIG. 3B, when the mobile device 17 is located within the signal coverage 110 of the BS 11, the mobile device 17 performs a wireless connection procedure 140 (including a procedure of handover to the BS 11) with the wireless network interface 115 of the BS 11 to set up a wireless connection therebetween. Then, the wired network interface 111 of the BS 11 performs a mobile device information acquisition procedure 142 with the server 15 to acquire information related to the mobile device 17. Afterwards, the wired network interface 111 of the BS 11 transmits a monitoring signal 144, which carries a connection ID and a piece of operating frequency information of the mobile device 17, to the femtocell 13 so that, after the monitoring signal 144 is received by the femtocell 13, the first wireless network interface 135 of the femtocell 13 can monitor the mobile device 17 on an operating frequency indicated by the operating frequency information according to the connection ID. The connection ID is a well-known concept in the WiMAX standard, so no further description will be made herein.

Afterwards, the wireless network interface 115 of the BS 11 broadcasts an uplink-MAP (UL-MAP) message 146, which carries a resource configuration message corresponding to the connection ID. The resource configuration message carries a time interval that is available for the mobile device 17 corresponding to the connection ID to transmit data. The resource configuration message is also a well-known concept in the WiMAX standard, so no further description will be made herein. Because the wireless network interface 115 transmits the UL-MAP message 146 in broadcast, both the mobile device 17 and the femtocell 13 located in the signal coverage 110 of the BS 11 can receive the Ul-MAP message 146. Then, the first wireless network interface 135 of the femtocell 13 snoops on the operating frequency indicated by the operating frequency information to determine if there is data transmitted in the available time interval carried in the resource configuration message.

Referring next to FIG. 3A, if the mobile device 17 transmits a signal (i.e., an uplink protocol data unit 148) to the BS 11 in the available time interval carried in the resource configuration message, this signal (i.e., the uplink protocol data unit 148) will be detected by the first wireless network interface 135 of the femtocell 13. The wired network interface 131 of the femtocell 13 then transmits to the BS 11 a response signal 150 carrying the connection ID of the mobile device 17 and stops monitoring the mobile device 17. Thereafter, the wireless network interface 115 of the BS 11 transmits to the mobile device 17 a handover signal 152 which carries information of the BS 11 and the femtocell 13. Then according to the handover signal 152, the mobile device 17 performs a wireless connection procedure 154 with the femtocell 13 to wirelessly connect to the femtocell 13.

Referring next to FIG. 3B, in FIG. 3B, after the UL-MAP message 146 is broadcasted by the wireless network interface 115, the mobile device 17 performs a logoff procedure 160 with the BS 11. In this case, the mobile device 17 does not enter the signal coverage 130 of the femtocell 13, so the wired network interface 111 of the BS 11 transmits to the femtocell 13 a monitoring stop signal 162 carrying the connection ID of the mobile device 17. Upon the wired network interface 131 of the femtocell 13 receiving the monitoring stop signal 162, the femtocell 13 stops monitoring the mobile device 17.

With the arrangement and operations of the second embodiment, when the wireless network system conforms to the WiMAX standard, the problem that the femtocell stays idle and the problems caused by network-initiated handover in the prior art can also be solved.

Figure 4A:
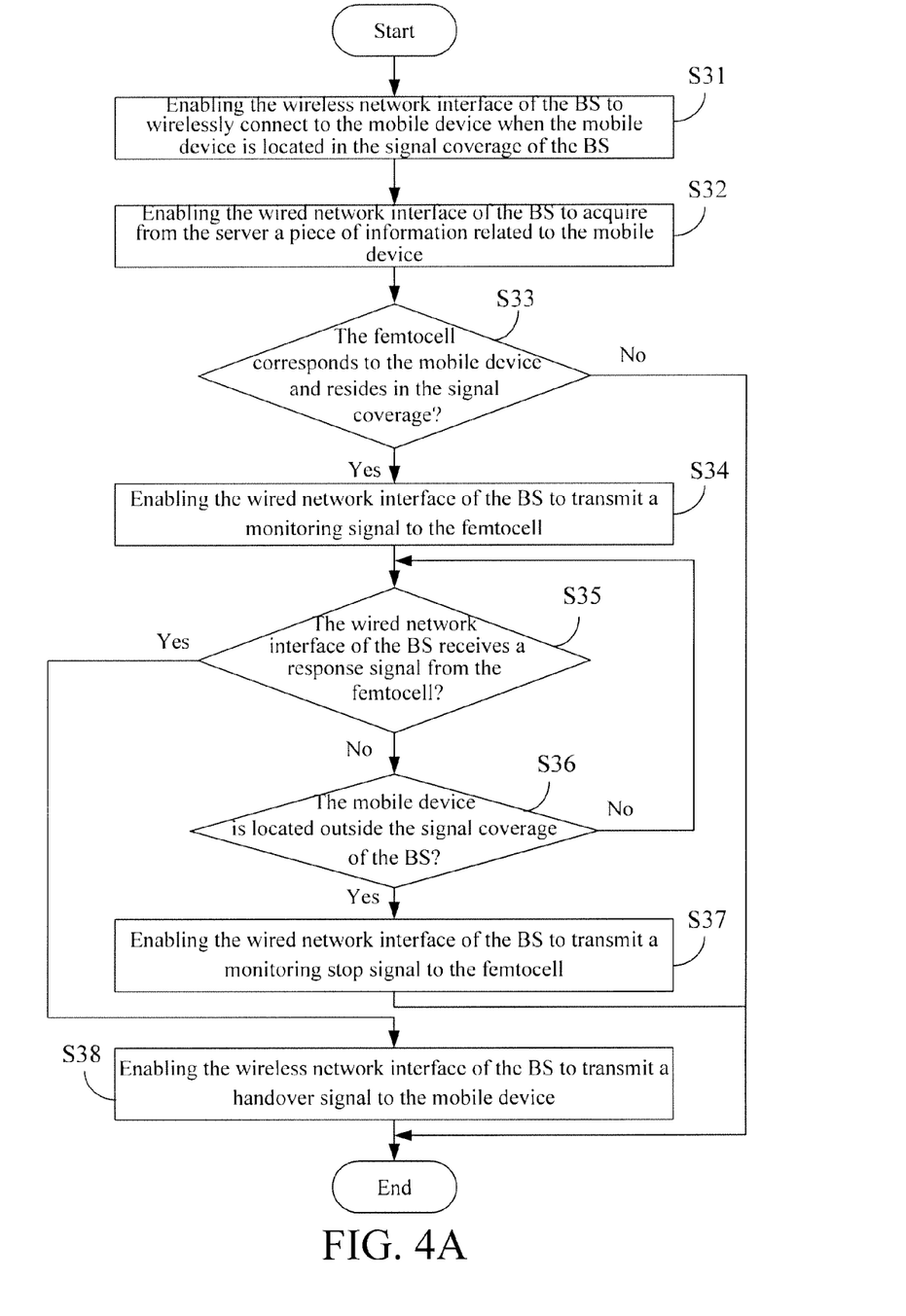
FIGS. 4A and FIG. 4B are schematic views illustrating a flowchart of a third embodiment of the present invention.
Figure 4B:
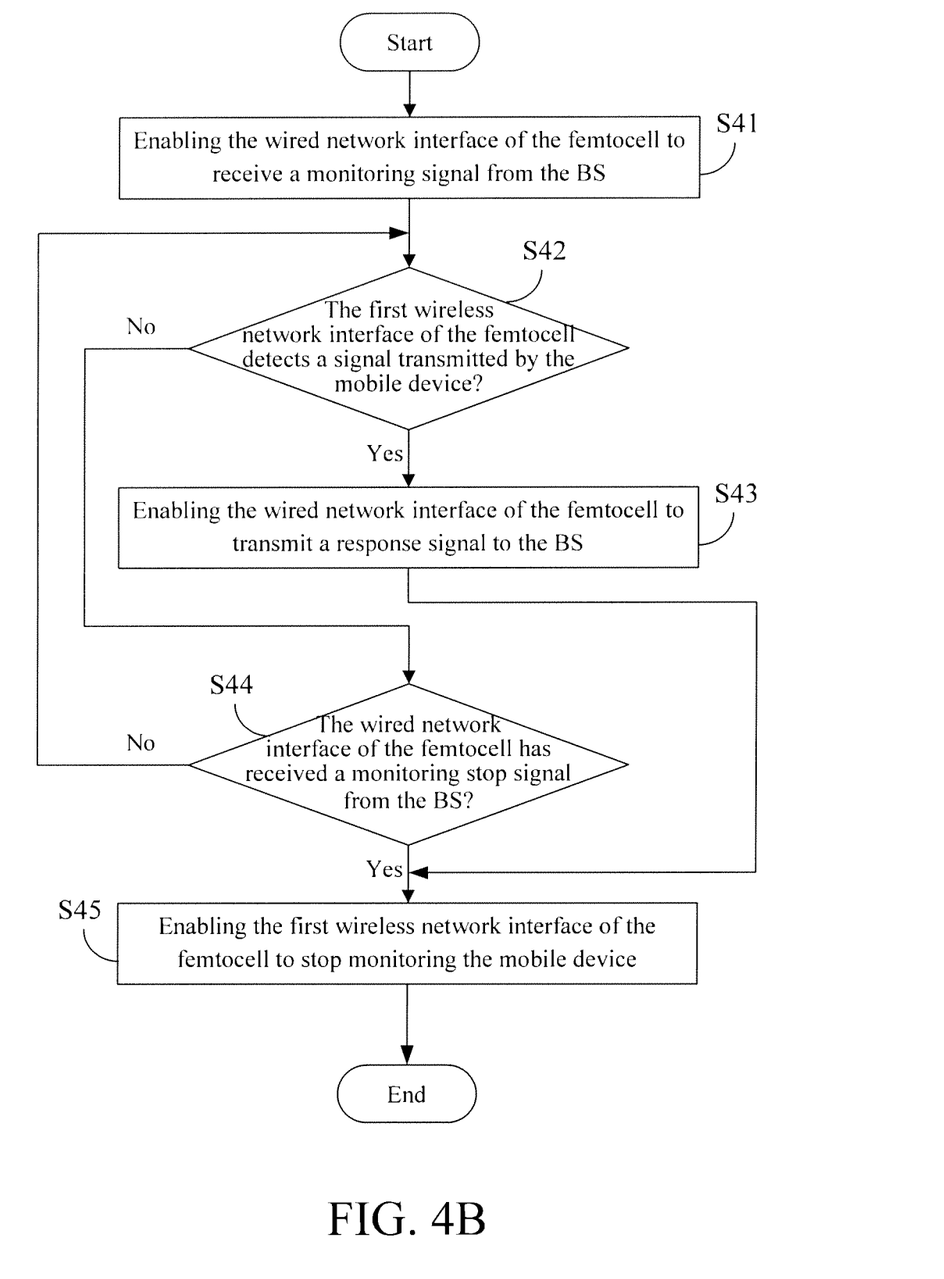

A third embodiment of the present invention is a handover monitoring method for a wireless network system. The wireless network system comprises a BS, a femtocell, a server and a mobile device, which may be the BS 11, the femtocell 13, the server 15 and the mobile device 17 of the first embodiment respectively. FIG. 4A and FIG. 4B depict a flowchart of the third embodiment, in which the portion depicted in FIG. 4A is executed by the BS and the portion depicted in FIG. 4B is executed by the femtocell.

Additionally, the handover monitoring method described in the third embodiment can be implemented by a computer program product. When the computer program product is loaded into the BS 11 and the femtocell 13 respectively and a plurality of codes comprised in the computer program product is executed, the handover monitoring method described in the third embodiment can be accomplished. The computer program product may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

Firstly, referring to FIG. 4A, the handover monitoring method of the third embodiment will be described from the perspective of the BS. Step S31 is executed to enable the wireless network interface 115 of the BS 11 to wirelessly connect to the mobile device 17 when the mobile device 17 is located in the signal coverage of the BS 11. Then, step S32 is executed to enable the wired network interface 111 of the BS to acquire from the server 15 a piece of information related to the mobile device 17. Thereafter, step S33 is executed to enable the processor 113 to determine whether the femtocell 13 corresponds to the mobile device 17 and resides in the signal coverage. If the determination result in step S33 is "no", then the handover monitoring will not be performed. Otherwise, if the determination result in step S33 is "yes", then step S34 is executed to enable the wired network interface 111 to transmit to the femtocell 13 a monitoring signal for directing the femtocell 13 to monitor the mobile device 17 on an operating frequency.

Next, step S35 is executed to enable the BS to determine whether the wired network interface 111 thereof receives from the femtocell 13 a response signal corresponding to the monitoring signal within a preset time interval. If the determination result in step S35 is "yes", then step S38 is executed to enable the wireless network interface 115 of the BS 11 to transmit a handover signal to the mobile device 17 so that the mobile device 17 can handover from the BS 11 to the femtocell 13 and connect to the second wireless network interface of the femtocell 13. Otherwise, if the determination result in step S35 is "no", then step S36 is executed to enable the BS to determine whether the mobile device 17 is located outside the signal coverage of the BS 11 (i.e., to determine whether the mobile device 17 has performed a logoff procedure and has moved out of the signal coverage of the BS 11). Thereafter, if the determination result in step S36 is "yes", then step S37 is executed to enable the wired network interface 111 to transmit to the femtocell 13 a monitoring stop signal for directing the wireless network interface of the femtocell to stop monitoring the mobile device 17. If the determination result in step S36 is "no", then the handover monitoring method returns to step S35.

It shall be appreciated that, step S36 may be omitted in other examples of the present invention; in other words, if the determination result in step S35 is "no", then step S37 is executed directly to enable the wired network interface 111 to transmit to the femtocell 13 a monitoring stop signal for directing the wireless network interface of the femtocell to stop monitoring the mobile device 17. The intention of such examples is that: if the BS 11 fails to receive from the femtocell 13 a response signal corresponding to the monitoring signal within the preset time interval, then the BS 11 considers that the mobile device 17 will not enter the signal coverage of the femtocell 13 within a future time period either and, thus, notifies the femtocell to stop monitoring the mobile device 17.

Furthermore, the handover monitoring method of the present invention may also be implemented in form of another example, in which step S36 is executed directly after step S34. In this case, if the determination result of step S36 is "yes", then step S37 is executed to enable the wired network interface 111 to transmit a monitoring stop signal to the femtocell 13; otherwise, if the determination result of step S36 is "no", then step S36 will be executed again after a time interval. In this example, the BS 11 decides whether to notify the femtocell to stop monitoring the mobile device 17 according to the position of the mobile device 17.

As can be known from the several different examples described above, the handover monitoring method for the BS of the present invention may define a stop condition to stop the monitoring. When the stop condition is satisfied, the wired network interface of the BS transmits a monitoring stop signal to the femtocell. How the present invention accomplishes the procedure of stopping the monitoring according to other stop conditions will be appreciated by those of ordinary skill in the art based on the several examples described above.

Next, referring to FIG. 4B, the handover monitoring method of the third embodiment will be described from the perspective of the femtocell. Step S41 is executed to enable the wired network interface 131 of the femtocell 13 to receive a monitoring signal from the BS. Next, step S42 is executed to enable the first wireless network interface 135 of the femtocell 13 to determine whether a signal transmitted by the mobile device 17 is detected within a preset time interval. If the determination result in step S42 is "yes", then step S43 is executed by the femtocell 13 to enable the wired network interface 131 thereof to transmit a response signal corresponding to the monitoring signal to the BS 11. Thereafter, this handover monitoring method is ended by the femtocell 13. Otherwise, if the determination result in step S42 is "no", then step S44 is executed by the femtocell 13 to determine whether the wired network interface 131 of the femtocell 13 has received a monitoring stop signal from the BS after the preset time interval. If the determination result in step S44 is "no", then step S42 is executed again by the femtocell; otherwise, if the determination result in step S44 is "yes", then step S45 is executed by the femtocell to enable the first wireless network interface 135 to stop monitoring the mobile device 17.

Similarly, in other examples, the monitoring signal and the monitoring stop signal may further carry a piece of operating frequency information of the mobile device 17. Thus, step S42 is to enable the first wireless network interface 135 of the femtocell 13 to monitor or stop monitoring the mobile device 17 on an operating frequency according to the operating frequency information. The operating frequency is a frequency on which the mobile device 17 wirelessly communicates with the BS 11. Additionally, other examples may further define that only when the signal transmitted by the mobile device 17 has a strength greater than a threshold, can the signal transmitted by the mobile device 17 be detected in step S42.

In addition to the aforesaid steps, the third embodiment can also execute all the operations and functions set forth in the first embodiment. How the third embodiment executes these operations and functions will be readily appreciated by those of ordinary skill in the art based on the explanation of the first embodiment, and thus will not be further described herein.

A fourth embodiment of the present invention is a handover monitoring method for a wireless network system. The wireless network system also comprises a BS, a femtocell, a server and a mobile device. The fourth embodiment differs from the third embodiment in that, in the fourth embodiment, the handover monitoring method is applicable to a wireless network system conforming to the WiMAX standard. Hereinbelow, only differences of the fourth embodiment from the third embodiment will be described.

Figure 5:
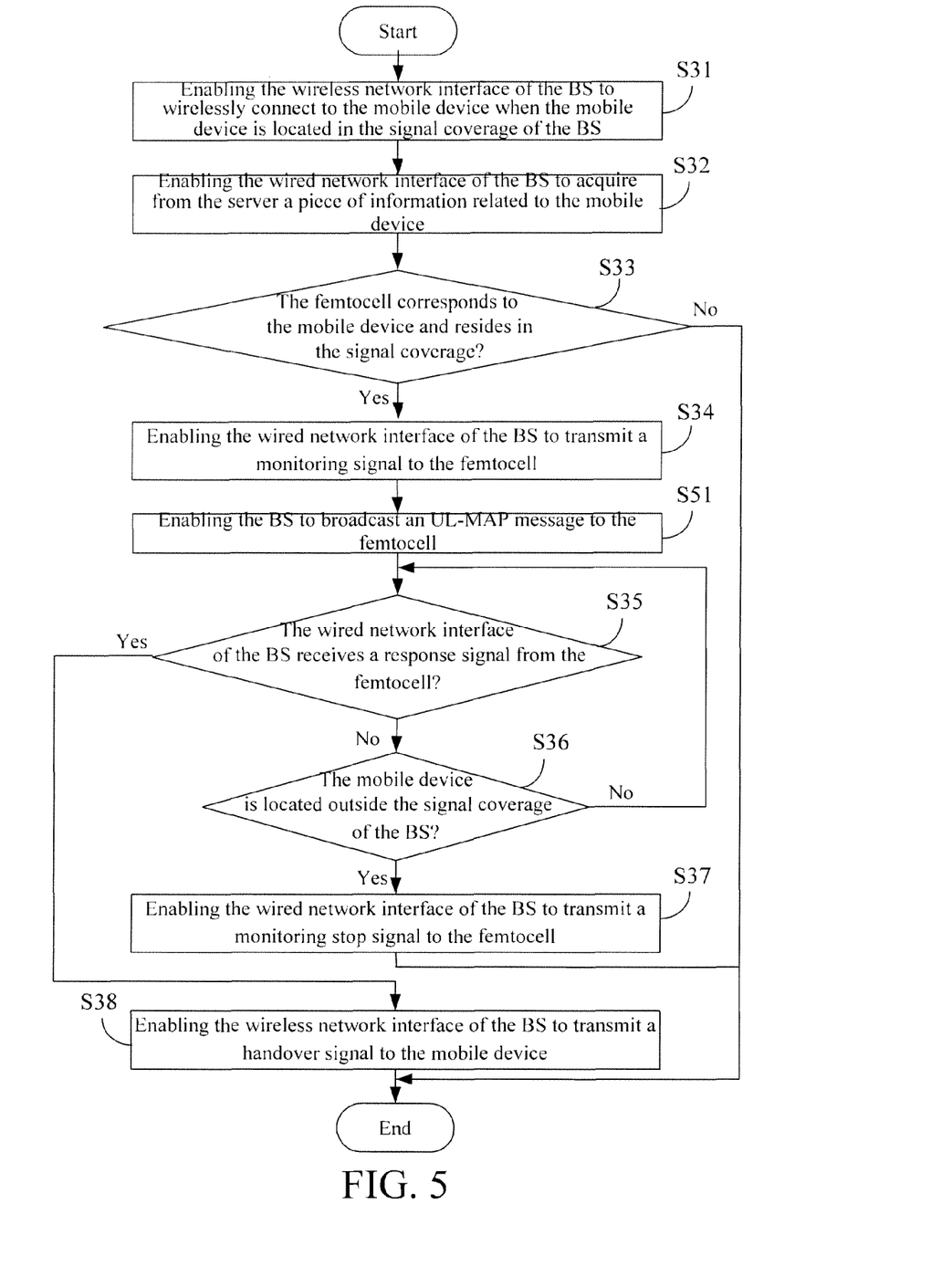
FIG. 5 is a flowchart of a handover monitoring method performed by a BS according to the fourth embodiment of the present invention.

FIG. 5 depicts the handover monitoring method executed by the BS. The BS firstly executes step S31 to step S34, which are roughly the same as those described in the third embodiment except that in the fourth embodiment, the monitoring signal carries a connection ID of the mobile device. Next, step S51 is executed by the BS to enable the wireless network interface of the BS to broadcast an UL-MAP message, which carries a resource configuration message corresponding to the connection ID. Thereafter, the BS executes step S35 to step S38, which are roughly the same as those described in the third embodiment. However, in the fourth embodiment, the response signal received in step S35 carries the connection ID of the mobile device, and the monitoring stop signal transmitted in step S37 also carries the connection ID of the mobile device.

From the perspective of the femtocell 13, when the wireless network system conforms to the WiMAX standard, the process flow depicted in FIG. 4B is also executed by the femtocell 13. The difference lies only in that, in the fourth embodiment, the monitoring signal in step S41 carries a connection ID of the mobile device, the signal detected in step S42 is an uplink protocol data unit, the response signal in step S43 carries the connection ID of the mobile device, and the monitoring stop signal in step S44 also carries the connection ID of the mobile device.

In addition to the aforesaid steps, the fourth embodiment can also execute all the operations and functions set forth in the second embodiment. How the fourth embodiment executes these operations and functions will be readily appreciated by those of ordinary skill in the art based on the explanation of the second embodiment, and thus will not be further described herein.

According to the above descriptions, after the mobile device enters the signal coverage of the BS, the BS transmits a monitoring signal to the femtocell so that the femtocell can monitor the mobile device according to this monitoring signal. If the monitoring result reveals that the mobile device has entered the signal coverage of the femtocell, then the femtocell transmits a response signal to the BS so that the BS directs the mobile device to perform the handover. Thereby, the problem that the femtocell stays idle and the problems caused by network-initiated handover in the prior art can be effectively solved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A femtocell, a wireless network system comprising a server, a mobile device, a BS and the femtocell, the wireless network system conforming to the WiMAX standard, the femtocell comprising:
   a wired network interface, connecting to the BS and being configured to receive a monitoring signal which carries a connection ID of the mobile device from the BS;
   a first wireless network interface, being configured to receive an UL-MAP message which carries a resource configuration message corresponding to the connection ID from the BS, monitor the mobile device on an operating frequency according to the connection ID and the resource configuration message and detect a signal transmitted by the mobile device; and
   a second wireless network interface;

wherein upon detecting the signal, the first wireless network interface stops monitoring the mobile device, the wired network interface transmits a response signal corresponding to the monitoring signal to the BS so that the BS transmits a handover signal to the mobile device after receiving the response signal, the handover signal is for directing the mobile device to handover to the femtocell so as to connect to the second wireless network interface.

2. The femtocell as claimed in claim 1, wherein the signal has a strength greater than a threshold.

3. A handover monitoring method for a femtocell, a wireless network system comprising a server, a mobile device, a BS and the femtocell, the wireless network system conforming to the WiMAX standard, the femtocell comprising a wired network interface, a first wireless network interface and a second wireless network interface, and the wired network interface connecting to the BS, the handover monitoring method comprising the following steps of:

(a) enabling the wired network interface to receive a monitoring signal which carries a connection ID of the mobile device from the BS;

(b) enabling the first wireless network interface to receive an UL-MAP message which carries a resource configuration message corresponding to the connection ID from the BS;

(c) enabling the first wireless network interface to monitor the mobile device on an operating frequency according to the connection ID and the resource configuration message and detect a signal transmitted by the mobile device, after step (b);

(d) enabling the first wireless network interface to stop monitoring the mobile device after the step (c); and (e) enabling the wired network interface to transmit a response signal corresponding to the monitoring signal to the BS after the step (c), so that the BS transmits a handover signal to the mobile device after receiving the response signal, the handover signal directing the mobile device to handover to the femtocell so as to connect to the second wireless network interface.

4. The handover monitoring method as claimed in claim 3, wherein the signal detected in the step (c) has a strength greater than a threshold.

* * * * *